Aug. 24, 1965
A. C. MASBRUCH
3,202,437
SLED
Filed Jan. 20, 1964
2 Sheets-Sheet 1
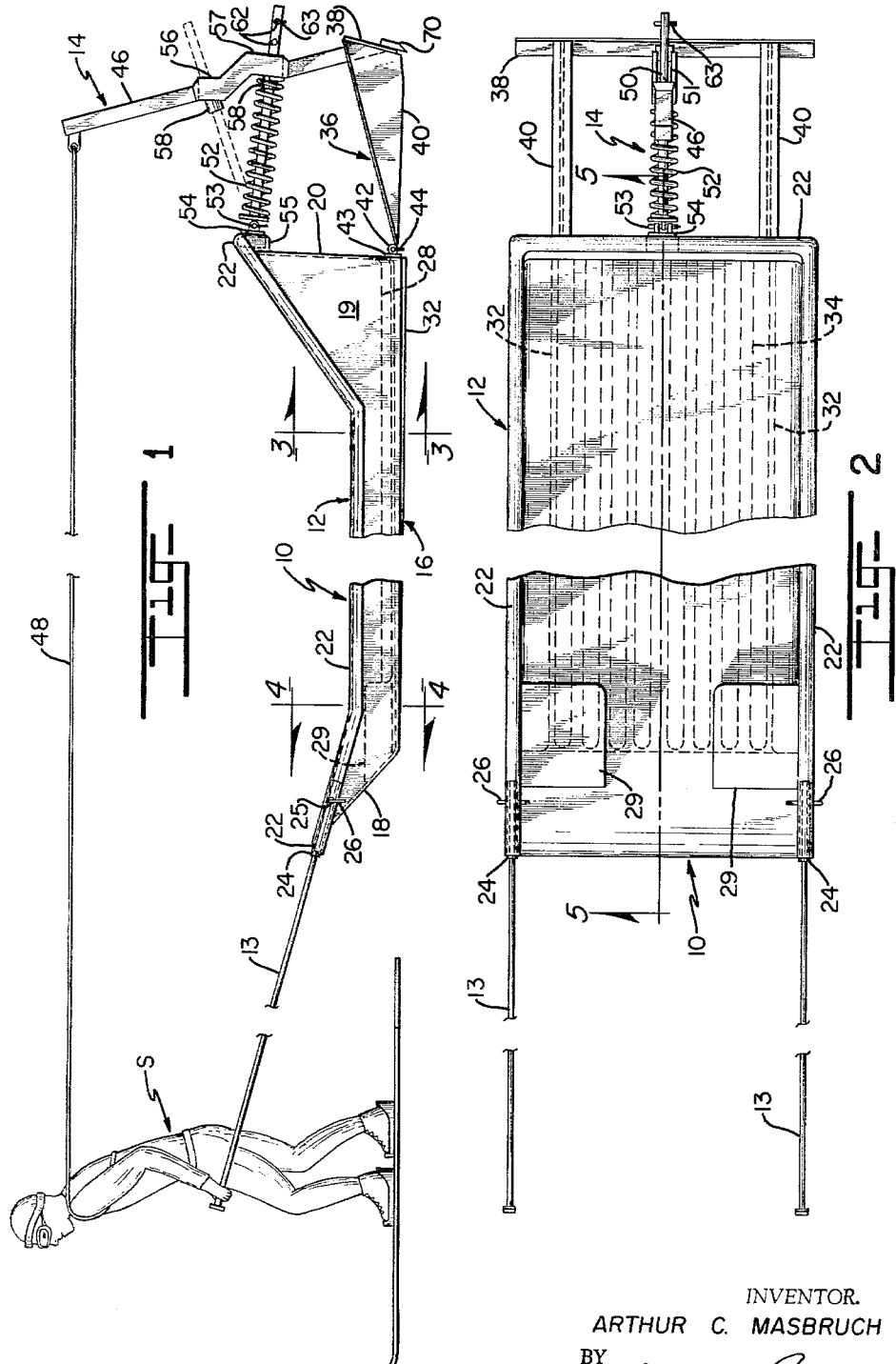
INVENTOR.
ARTHUR C. MASBRUCH
BY
John E. Reilly
ATTORNEY Aug. 24, 1965         A. C. MASBRUCH         3,202,437
                            SLED
Filed Jan. 20, 1964                    2 Sheets-Sheet 2
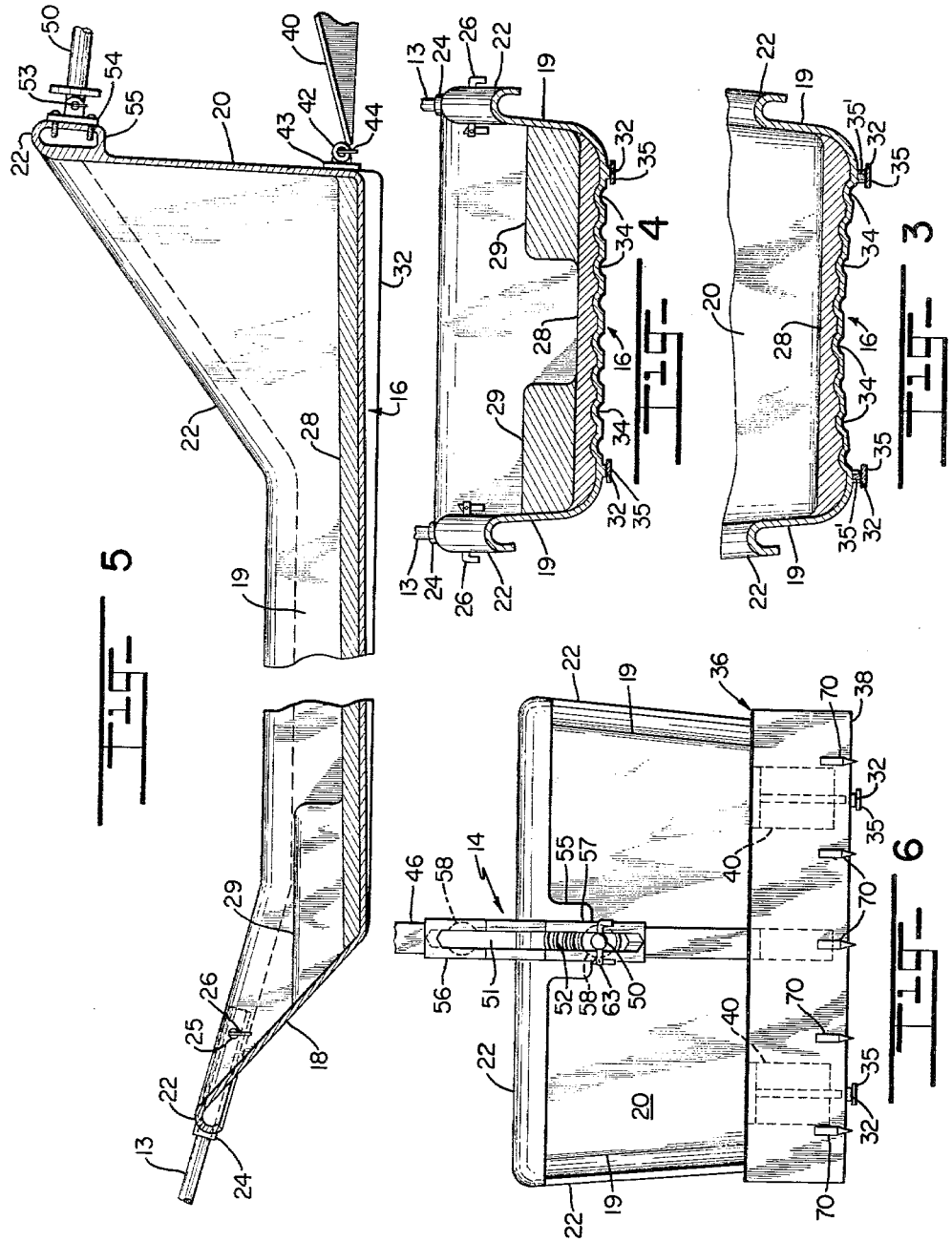
INVENTOR.
ARTHUR C. MASBRUCH
BY
ATTORNEY 3,202,437
SLED
Arthur C. Masbruch, 12 S. Zephyr, Denver, Colo.
Filed Jan. 20, 1964, Ser. No. 338,917
10 Claims. (Cl. 280—18)

This invention relates to a novel and improved sled, and more particularly relates to a rescue sled adaptable for transporting injured persons or loads over snow and ice-covered terrain.

Although the sled of the present invention has a number of useful applications, it is specifically adapted for use in rescue operations in snow-covered mountainous or hilly areas, for instance, to facilitate the removal of injured skiers. In this relation, the sled is so constructed and arranged that it can be guided and controlled in speed and direction by a single person, and has improved balance and tracking characteristics while being lightweight and inexpensive in construction and assembly. Furthermore, a novel and improved brake assembly is employed to provide positive, even braking action, and the brake assembly is made easily removable to permit use of the sled as a litter.

Accordingly, a principal and foremost object of the present invention is to provide for a new and useful sled which is lightweight, rugged, simplified and inexpensive in construction, and which is capable of being controlled in speed and direction from the forward end of the sled.

It is another object of the present invention to provide in a sled for a new and useful brake assembly which will afford positive and even braking along with automatic braking action in the event that the operator loses control of the sled; and still further wherein the brake assembly may be removably mounted behind the sled while being controlled from the opposite forward end of the sled by a skier in a dependable manner.

It is a further object of the present invention to provide a rescue sled including a body of one piece construction having improved tracking and directional control for ease of guiding and steering over snow and ice-covered terrains.

The above and other objects, advantages and features of the present invention will become more readily understood and appreciated from a consideration of the following detailed description taken together with the accompanying drawings, in which:

FIGURE 1 is a side view of a preferred form of sled construction.

FIGURE 2 is a top plan view of the preferred form of sled shown in FIGURE 1.

FIGURE 3 is a sectional view taken on line 3—3 of FIGURE 1, and shows a modified form of runner construction.

FIGURE 4 is a sectional view taken on line 4—4 of FIGURE 1 including the modified form of runner construction.

FIGURE 5 is a vertical section view taken on line 5—5 of FIGURE 2; and

FIGURE 6 is an end view showing in detail the preferred form of brake assembly.

Referring in detail to the drawings, there is shown by way of illustrative example a preferred form of rescue sled 10 broadly comprised of a main body 12, towing or guide arms 13 and a brake assembly 14. Preferably, the body 12 is fabricated out of a single sheet of molded plastic material, such as Fiberglas, although it may be suitably composed of a lightweight metal or other materials having the requisite strength and durability. In construction, the material employed is formed to define a central, generally horizontal running surface portion 16 with a front end wall 18, opposed side walls 19 and a rear end wall 20 forming upwardly extending continuations of the central running surface portion. Here, it will be noted that the front end wall 18 extends forwardly at a relatively low angle; whereas the side and rear end walls 19 and 20 form substantially vertical continuations of the central running surface portion. In addition, the side walls are of limited height along the forward and intermediate portions of the sled, then progressively increase in height or slope upwardly toward the rear end of the sled so that the highest point along the wall surfaces is along the rear end wall 20, the latter serving as a mounting surface for the brake assembly 14. Moreover, the upper edges of the front, side and rear end wall surfaces most desirably terminate in generally circular lips or rims 22 which extend continuously in surrounding relation to the sled.

The towing arms 13 form forward extensions from the front end of the sled, and as shown the arms 13 are removably attached to tubular holders 24 of limited length which are molded in place beneath the rim 22 along the upwardly inclined, forward extremities of the side walls 19. Each of the towing arms is defined by a rod or elongated tubular member which is inserted within a tubular holder 24 until a transverse opening, not shown, in the arm is aligned with transverse openings 25 in the holder to permit insertion of a connection pin 26 therethrough to hold the arms securely in place. In this relation, the connecting pins 26 preferably are manually releasable so as to permit removal of the towing arms 13, for example, when it is desired to use the sled as a litter.

In order to provide added comfort and safety for instance in carrying injured personnel, the inner surface of the sled is lined with a material represented at 28, such as, a flexible polyurethane foam material; also, a pair of shoulder blocks 29 are composed of a somewhat more rigid polyurethane foam and are located in spaced relation toward the front end of the sled so that a person may be stretched out in a prone position with his head positioned between the shoulder blocks and his shoulders abutting the end surfaces of the blocks in order to prevent shifting or sliding in the sled.

Now considering in more detail the configuration of the running surface portion 16 of the sled, it will be seen from FIGURES 3 and 4 that the elongated central section of the sled is somewhat raised while curving laterally and downwardly in opposite directions away from the longitudinal axis and terminating in downwardly projecting runners 32 which extend longitudinally along opposite sides of the running surface portion. Accordingly, the running surface portion is generally concave in cross-section and additionally is corrugated or otherwise formed with longitudinally extending ribs 34 which in cooperation with the generally concave curvature of the running surface portion will afford greatly improved tracking characteristics in the sled. Moreover, it will be noted that the runners 32 taper forwardly or in other words are of progressively decreasing thickness from the rear to the front end wall of the sled. Similarly, the running surface portion 16 progressively decreases in curvature toward the front end of the sled so as to be relatively flat at the intersection of the running surface portion with the front end wall 18. As a result, the space formed between the runners and exterior running surface portion increases in a rearward direction along the sled to provide a progressively increasing clearance area for the snow. This form of construction will not only reduce the drag exerted by the snow on the movement of the sled but also has been found to lend greatly to improved tracking and steering characteristics, especially when the sled is guided from the forward end. As shown in FIGURES 3 and 4, the runners may be provided, also, with relatively wide, thin strips 35 along their lower edges when the sled is used on hard snow or icy conditions. The strips 35 may be suitably composed of metal and fastened to reinforcing blocks 35', imbedded in the runners, by means of screws not shown.

A removable brake assembly 14 is pivotally secured in spaced trailing relation to the rear end wall of the sled, and is designed to afford automatic and positive braking with the braking action taking effect evenly along an area traversing the width of the sled. To this end, the assembly includes a lower brake structure 36 consisting of a braking member defined by a blade 38 pivotally connected to the lower edge of the rear end wall 20 by spaced, triangular braces 40 has a hinge portion 42 for connection with a complementary hinge portion 43 on the end wall by a connecting pin 44. Preferably, the blade 40 is formed of a relatively thin, flat metal plate of a length correspnding to the width of the sled. In attached relation the blade is angled forwardly and downwardly in relation to the sled direciton of travel, so that in braking it will upon contact with the snow tend to dig sharply into the snow until the vehicle comes to a complete stop. In addition, tongs 70 may be affixed to the rear surface of the blade in downwardly extending relation, as shown in FIGURES 1 and 5, to brake the sled on icy surfaces where otherwise the blade alone may not supply the necessary braking action. Similarly, the tongs will slant forwardly when released for downward swinging movement into the snow or ice so as to exert the desired braking action. With or without the tongs, however, the blade will effect positive even braking when released and the lower edges of the braces 40 will cooperate with the blade to prevent sidewise slipping or skidding of the sled.

A brake control lever 46 extends upwardly from its connection to the front surface of the blade 38 and has a control cable 48 secured to its upper end and which is of a length that it can be grasped by the operator or skier S situated between the towing arms 13 at the front end of the sled. Thus, any tension exerted by the operator on the control cable will, through the control lever 46, tend to hold the blade 38 in a raised postion out of the snow. Most desirably, the blade 38 is normally biased to move downwardly into braking engagement with the snow, and this may be accomplished by insertion of a guide arm 50 through slot 51 in the control lever 46 with a compression spring 52 coiled around the arm 50 and acts against the side of the lever 46 in a direction tending to urge the blade 40 downwardly into braking engagement. Preferably, the front end of the arm 50 is pivotally connected by releasable pins to a bracket 54 mounted on a block 55 which is located beneath the rim 22 along the upper edge of the rear end wall. The control lever is shown having upper and lower angularly offset portions 56 and 57 along the slotted area with a split collar 58 for each offset portion so that the guide arm can be directed to extend through either offset portion with the outer end of the spring clamped around the collar in order to hold the arm against slipping. It will be evident that in the upper position the spring is compressed to a greater extent than in the lower position so as to exert increased tension against the control lever. Thus, for example, on steeper slopes where more braking action would be required, the arm would be set in the upper position to exert greater pressure on the blade urging it into the braking position.

In practice, the skier S by leaning forward and grasping the control cable can apply the necessary tension on the control lever to overcome the bias of the spring 50 and hold the brake out of engagement with the snow. By relaxing somewhat the tension on the control cable of course the spring 52 will then be effective to urge the blade downwardly into engagement with the snow, and this braking action of course can be regulated by the skier so as to either slow down or to completely stop the sled as desired. Moreover, in the event the skier should accidentally lose control of the sled and release cable, then of course under the urging of the spring the brake structure will automatically stop the sled. In order to hold the brake structure in a raised position without use of the control cable, openings 62 are formed adjacent the outer end of the guide arm for insertion of a stop 63 through one of the openings and against which the back of the control lever will rest so as to limit the outward movement of the control lever, as illustrated in FIGURE 1.

To employ the sled as a litter, it is merely necessary to remove the brake assembly by withdrawal of the release pins 44 and 53 holding the lower brake structure and guide arms respectively. In a similar manner, the towing arms 13 may be removed by withdrawal of the release pins 26, and of course, the rim 22 serves as a convenient handle for lifting the sled.

From the foregoing, therefore, it will be seen that a rescue sled as exemplified by the preferred form of the present invention incorporates a number of new and useful features which makes the sled readily conformable for use in various types of rescue operations while being lightweight, rugged and inexpensive in construction. Moreover, the brake assembly apart from the particular sled construction is considered to be of utility in effecting positive and even braking action while permitting close control by the skier or operator of the sled. It is therefore to be understood that various modifications and changes may be made in the composition, construction and arrangement of parts comprising the present invention without departing from the spirit and scope thereof as defined by the appended claims and reasonable equivalents thereof.

What is claimed is:

1. A sled of one-piece construction comprising a main body including a raised, elongated center section curving laterally and downwardly in opposite directions away from the longitudinal axis of said sled, said center section progressively decreasing in curvature from the rearward to the forward end, and front, side and rear end wall portions forming upwardly directed continuations of said center section.

2. A sled according to claim 1 wherein said center section terminates in downwardly projecting runners along opposite sides thereof, said runners gradually decreasing in thickness from the rearward to the forward end of said center section.

3. A sled according to claim 1, said center section being formed with a series of laterally spaced longitudinally extending ribs.

4. In a sled, a brake assembly having a braking member, means pivotally securing said braking member in spaced relation behind the sled, a brake control lever extending upwardly from said member, biasing means associated with said control lever being operative to normally urge said control lever and connected braking member downwardly into braking engagement, and manual brake control means associated with said control lever for selectively holding said braking member out of braking engagement.

5. In a sled having an elongated main body section including an upstanding rear end wall portion, the combination therewith of a brake assembly having a blade, means pivotally securing said blade in spaced trailing relation to said body with the blade angling forwardly and downwardly in transverse relation to the longitudinal axis of said body, a brake control lever extending upwardly from said blade and a guide arm connected to the rear end wall portion and extending rearwardly through an opening in said control lever, said guide arm having a spring thereon normally urging said control lever and connected blade downwardly into braking position, and control means associated with said control lever for selectively holding said blade out of the braking position against the urging of the spring.

6. In a sled according to claim 5, said release means being defined by a control cable extending forwardly from said control lever.

7. In a sled according to claim 6, said control lever having means along the opening therein to regulate the spring tension exerted by said spring on said control lever and blade.

8. A rescue sled comprising: a main body section of one-piece construction having an elongated center section curving laterally and downwardly in opposite directions away from the longitudinal axis and terminating in downwardly projecting runners along opposite sides tapering in thickness from the rearward to the forward end thereof, a front end wall extending forwardly at a relatively low angle from said center section and being provided with towing arms on opposite sides thereof, and side and rear end walls forming substantially vertical continuations of said center section and said forward end wall with the side walls progressively increasing in height toward the rear end wall; and a brake assembly secured to said rear end wall including a braking member arranged in spaced trailing relation to said rear end wall, and brake control means extending forwardly from said brake assembly for controlling said braking member.

9. A rescue sled comprising: a main body section being integrally formed out of a relatively thin longitudinal sheet of material to define a raised elongated center section curving laterally and downwardly in opposite directions away from its longitudinal axis and terminating in downwardly projecting runners along opposite sides thereof, said center section being corrugated to define a series of longitudinally extending ribs therealong, a front end wall extending forwardly at a relatively low angle from said center section and being provided with handle arms on opposite sides thereof, and side and rear end walls forming substantially vertical continuations of said center section and the forward end wall with the side walls progressively increasing in height toward the rear end wall; and a brake assembly including a blade pivotally secured in spaced trailing relation to said rear end wall, biasing means normally urging said blade downwardly into a braking position, and a manual control cable extending forwardly from said brake assembly for selectively holding said blade out of the braking position against the urging of said biasing means.

10. A rescue sled according to claim 9, said runners having relatively wide, thin strips extending along the lower edges of said runners.

References Cited by the Examiner

UNITED STATES PATENTS

| | | | |
|---|---|---|---|
| 60,348 | 12/66 | Dutton | 188—8 |
| 218,504 | 8/79 | Doyle | 188—8 |
| 579,917 | 3/97 | Caffrey | 280—24 |
| 2,139,513 | 12/38 | Nelson et al. | 280—18 |
| 2,619,358 | 11/52 | Telenik | 280—16 |
| 2,829,902 | 4/58 | Stocker | 280—18 |
| 3,104,116 | 9/63 | Knight | 280—18 |
| 3,120,963 | 2/64 | Seckel | 280—28 |

ARTHUR L. LA POINT, *Primary Examiner.*